United States Patent
Dominguez et al.

(10) Patent No.: US 10,606,673 B2
(45) Date of Patent: Mar. 31, 2020

(54) APPARATUS AND METHOD FOR RUNNING PLURALITY OF THREADS

(71) Applicant: Huawei Technologies Co., Ltd., Shenzhen (CN)

(72) Inventors: David Dominguez, Munich (DE); Alexander Nozdrin, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 15/926,614

(22) Filed: Mar. 20, 2018

(65) Prior Publication Data

US 2018/0210772 A1  Jul. 26, 2018

Related U.S. Application Data

(63) Continuation of application No. PCT/EP2017/059237, filed on Apr. 19, 2017.

(30) Foreign Application Priority Data

Aug. 9, 2016 (EP) .................................... 16183428

(51) Int. Cl.
   *G06F 9/54* (2006.01)
   *G06F 16/28* (2019.01)
   *H04L 29/06* (2006.01)
   *G06F 9/48* (2006.01)

(52) U.S. Cl.
   CPC .............. *G06F 9/547* (2013.01); *G06F 9/485* (2013.01); *G06F 16/289* (2019.01); *H04L 67/40* (2013.01)

(58) Field of Classification Search
   None
   See application file for complete search history.

(56) References Cited

U.S. PATENT DOCUMENTS

| 5,956,509 | A | * | 9/1999 | Kevner | ............... G06F 13/14 709/203 |
| 6,901,596 | B1 | | 5/2005 | Galloway | |
| 7,051,335 | B2 | | 5/2006 | Gehring et al. | |
| 7,380,248 | B1 | | 5/2008 | Isenberg et al. | |
| 7,809,848 | B1 | | 10/2010 | McDougall et al. | |

(Continued)

FOREIGN PATENT DOCUMENTS

| CN | 101719902 A | 6/2010 |
| JP | 2007514990 A | 6/2007 |

(Continued)

OTHER PUBLICATIONS

"Stop-and-wait ARQ," Wikipedia, XP55328385, (Sep. 8, 2015).

(Continued)

*Primary Examiner* — Craig C Dorais
(74) *Attorney, Agent, or Firm* — Leydig, Voit & Mayer, Ltd.

(57) ABSTRACT

The present invention proposes an apparatus and method for running a plurality of threads. The apparatus includes a memory, a client and an RPC manager. The client is configured to generate, for each of the plurality of threads an RPC request for executing an operation and to store the generated RPC requests in a database in the memory. The RPC manager is configured to order the stored RPC requests. Furthermore, the client is configured to send the ordered RPC requests in an RPC batch.

14 Claims, 6 Drawing Sheets

(56) References Cited

U.S. PATENT DOCUMENTS

| 2005/0080930 | A1 | 4/2005 | Joseph |
| 2011/0145545 | A1 | 6/2011 | Hunter et al. |
| 2014/0007114 | A1 | 1/2014 | Wang et al. |
| 2015/0317193 | A1 | 11/2015 | Maeda |

FOREIGN PATENT DOCUMENTS

| JP | 2015210791 A | 11/2015 |
| WO | 2005125235 A2 | 12/2005 |

OTHER PUBLICATIONS

Eisler et al., "Network File System Design and Operation", XP55327917, p. 120 in Chapter (Jul. 11, 2011).

Steenkiste, "Design, Implementation, and Evaluation of a Single-copy Protocol Stack," Software-Practice and Experience, XP000754985, pp. 749-772, John Wiley & Sons, Ltd. (Jun. 1998).

Ousterhout et al., "The RAMCloud Storage System". ACM Transactions on Computer Systems, vol. 33, No. 3, Article 7 (Aug. 2015).

Lin et al., "An Asynchronous Remote Procedure Call System for Heterogeneous Programming" IEEE Tenth Annual International Phoenix Conference on Computers and Communications, pp. 153-159 (1991).

Ibrahim et al., "Remote Batch Invocation for Compositional Object Services," In proc. European Object Oriented Programming (Jul. 2009).

Nieuwpoort, "Efficient Java-Centric Grid-computing." pp. i-246 (2003).

"RPC Extensions Developer's Guide," Part No: 816-3576-10, pp. 1-40, Sun Microsystems, Inc. (Feb. 2002).

"Asynchronous Method Invocation for CORBA Component Model," Version 1.1., pp. i-18, Object Management Group (Aug. 2015).

"Java™ Remote Method Invocation Specification," Revision 1.41, JDK 1.1.1, pp. i-90, Sun Microsystems, Inc. (Mar. 24, 1997).

\* cited by examiner

APPARATUS AND METHOD FOR RUNNING PLURALITY OF THREADS

CROSS-REFERENCE TO RELATED APPLICATIONS

This application is a continuation of International Application No. PCT/EP2017/059237, filed on Apr. 19, 2017, which claims priority to European Patent Application No. 16183428.8, filed on Aug. 9, 2016. The disclosures of the aforementioned applications are hereby incorporated by reference in their entireties.

TECHNICAL FIELD

The present invention relates to an apparatus and a method for running a plurality of threads. In particular, the apparatus and the method of the present invention are able to send ordered remote procedure call (RPC) requests in an RPC batch, in order to increase an efficiency of an RPC procedure.

BACKGROUND

An RPC is a mechanism that allows an execution of a function in the address space of another process, which may be in a different computer. In a typical RPC procedure, an RPC request is generated by a client and then sent to a server. An RPC response, which is in response to the RPC request, is received by the client from the server.

In the state of the art, a common approach is that the client sends the RPC request and processes its corresponding RPC response in the same thread. In a situation where the RPC request is generated and sent by a first thread, a processor of the client is occupied by the first thread until the corresponding RPC response is received and processed. During a time interval between the RPC request and its corresponding RPC response, the first thread continuously polls a network card. Further, the time interval can become large due to a latency introduced by a network communication. Therefore, the processor cannot be released or used by other threads in a relatively long period of time.

If there are multiple threads in the client and each thread generates an RPC request with a destination to one or more remote computers, the efficiency of the RPC procedure executed by the client is low due to a continuous occupation of one thread.

SUMMARY

In view of the problems mentioned above, particularly the problem of low efficiency in executing the RPC procedure at the client's side, the present invention aims to improve the state of the art. Therefore, the present invention has the object to provide an apparatus and a method for running a plurality of threads to increase efficiency of an RPC procedure.

The above-mentioned object of the present invention is achieved by the solution provided in the enclosed independent claims. Advantageous implementations of the present invention are further defined in the respective dependent claims.

A first aspect of the present invention provides an apparatus for running a plurality of threads. The apparatus includes a memory, a client and an RPC manager. The client is configured to generate, for each of the plurality of threads, an RPC request for executing an operation and to store the generated RPC requests (in a database) in the memory. The RPC manager is configured to order the stored RPC requests. The client is further configured to send the ordered RPC requests in an RPC batch.

Hence, the apparatus or a client within the apparatus sends an RPC batch including multiple RPC requests and not the RPC requests individually. In such a way, multiple RPC-requests are actually sent in one batch, so the communicating overhead is significantly reduced. In other words, sending the RPC requests in a batch means that multiple RPC requests are sent by the client simultaneously. In this manner, the client can efficiently execute the RPC procedure without an inherent processor being occupied unnecessarily in a long time period.

Besides, the multiple RPC requests are ordered by the RPC manager. The RPC batch sent by the client includes the ordered RPC requests. Hence, an order (sequence) of the RPC requests exists in the RPC batch. This order indicates an RPC execution order on the receiver of the RPC batch, e.g., the server. In other words, an RPC batch defines an RPC execution order. That order determines the execution order of each RPC request from the batch.

Optionally, the responses corresponding to the RPC requests are also batched and sent within a single reply to the RPC batch including the RPC requests. Thus, the communicating overhead is reduced and efficiency of the apparatus is improved.

In a first implementation form of the apparatus according to the first aspect, the RPC manager is configured to order the stored RPC requests based on a time at which the stored RPC requests are generated.

Hence, the order of the RPC requests is configured based on a generation order of the RPC requests. The earlier an RPC request is generated, a higher probability on which the RPC is sent in an earlier order. For example, a first RPC is generated earlier in time than a second RPC. The first RPC is ordered with a higher priority than the second RPC request in one RPC batch. Thus, a response of the first RPC request is expected to arrive at the client earlier than a response of the second RPC request. According to another example, a third RPC request has a higher chance to be sent in a later RPC batch if the third RPC request is generated later than the second RPC request.

In a second implementation form of the apparatus according to the first implementation form of the first aspect, the RPC manager is configured to determine for each of the stored RPC requests at least one object, and order the stored RPC requests based on the time and the determined object.

Thereby, the RPC manager takes two parameters into account when determining the order of the RPC requests. The first parameter is the time at which the RPC request is generated. The second parameter is an object associated to the RPC. When different parameters are considered, a determination on the order of the RPC requests is more flexible. The object may be data, which can be included in the RPC request or referred with some type of key in the RPC request. Such object may be for instance a database object or data on which an operation is performed. The operation may be one of: adding an object, removing an object, modifying fields of an object, applying mathematical operations to a field of an object, recovering some parts of the object, converting the object to other schema.

In a third implementation form of the apparatus according to the second implementation form of the first aspect, all the ordered RPC requests correspond to the same object.

In this situation, a plurality of RPC requests corresponding to an object are ordered and sent based on the earliest of said plurality of RPC requests. In such a way, one earliest generated RPC request defines the priority of the plurality of RPC requests corresponding to a same object in the transmission. Hence, an execution of the RPC procedure related to this object is facilitated.

In a fourth implementation form of the apparatus according to the second implementation forms of the first aspect, the RPC manager is configured to order all the stored RPC requests corresponding to a first object before ordering a stored RPC request corresponding to a second object, where at least one ordered RPC request corresponding to the first object was generated by the client earlier than any ordered RPC request corresponding to the second object.

This facilitates a transmission of multiple RPC requests corresponding to one object via one RPC batch. For example, the second RPC request is generated after the first RPC request and before the third RPC request. Assuming the first RPC request and the third RPC request correspond to the first object and the second RPC request corresponds to the second object, the third RPC request will be ordered to have a priority higher than the second RPC request.

In a fifth implementation form of the apparatus according to the fourth implementation forms of the first aspect, a status of each generated RPC request is set when being stored in the data structure and afterwards updated based on a status of previously ordered RPC requests.

By introducing a status of the RPC request, which can be set and updated in certain conditions, a timely and convenient management of the RPC requests in the apparatus is facilitated. The client or the RPC manager can set or update the status of the RPC request according to a certain strategy, which facilitates to adjust an execution burden of different parts in the apparatus.

In a sixth implementation form of the apparatus according to the fifth implementation form of the first aspect, the status of each generated RPC request is one of following: PENDING, SENDABLE, SENT and COMPLETED. The status is set as PENDING at the moment when the generated RPC request is stored in the data structure. The status is set as SENDABLE, if the ordered RPC request corresponding to an object is not sent and statuses of all the previous sent RPC requests corresponding to said object are set as COMPLETED. The status is set as SENT, if the ordered RPC request is sent and a response to said ordered RPC request is not received by the client. The status is set as COMPLETED, if the response to the ordered RPC request is received.

The four statuses of the RPC requests are connected with each other in certain conditions so that a timely management of the RPC procedure in the apparatus is ensured. The apparatus can accurately control the whole RPC procedure related to each RPC request based on the four statuses.

In a seventh implementation form of the apparatus according to any of previous implementation forms of the first aspect, the ordered RPC requests are sent in the batch by a thread running in the apparatus.

In other words, any thread running in the apparatus can be used to send the batch including the ordered RPC requests. The thread can be the same as or different from any one of the plurality of threads generating the RPC requests. Hence, the apparatus doesn't have to have a dedicated thread for sending batches which leads to more efficient processor (e.g., CPU) usage.

In an eighth implementation form of the apparatus according to the seventh implementation forms of the first aspect, the ordered RPC requests are sent to a server which is outside the apparatus, e.g., in another computing device.

Hence, an efficiency of transmitting the RPC requests between two apparatus, which may be located (in two computers) remote from each other, is increased.

In a ninth implementation form of the apparatus according to any of previous implementation forms of the first aspect, the client is configured to store the generated RPC requests in a shared data structure accessible by the RPC manager.

In other words, a data structure shared among the plurality of threads in the client can be accessed by the RPC manager. Hence, any execution on the RPC requests stored in the shared data structure can be performed by or exchanged between both the client and the RPC manager. In practice, an efficiency of the apparatus in an internal processing and managing can be flexibly improved.

In a tenth implementation form of the apparatus according to any of the second to the ninth implementation forms of the first aspect, the operation to be executed based on the RPC request is a database operation and the object is a database object.

Database can be considered as a technical field, in which an operation refers to a database operation and an object refers to a database object. For example, a set of database operations can be performed on a database. A database operation is a mapping from one database state to another. Such mappings need not preserve consistency. In a further example, database object is any defined object in a database that is used to store or reference data. For example, a database object is a unit of data in the database such as one or more fields of a record, one or more records, or one or more tables.

A second aspect of the present invention provides a system including the apparatus according to the first aspect of the present invention, and a server being configured to receive the RPC batch from the apparatus.

A third aspect of the present invention provides a method for running a plurality of threads, including: generating by an apparatus for each of the plurality of threads an RPC request for executing an operation; storing by the apparatus the generated RPC requests (in a database) in the memory of the apparatus; ordering by the apparatus the stored RPC requests; and sending by the apparatus the ordered RPC requests in an RPC batch.

In a first implementation form of the method according to the third aspect, the stored RPC requests are ordered based on a time at which the stored RPC requests are generated.

In a second implementation form of the method according to the first implementation form of the third aspect, the method further including: determining by the apparatus for each of the stored RPC requests at least one object, wherein the stored RPC requests are ordered based on the time and the determined object.

In a third implementation form of the method according to the second implementation form of the third aspect, where all the ordered RPC requests correspond to the same object.

In a fourth implementation form of the method according to the second implementation forms of the third aspect, the method further including: ordering all the stored RPC requests corresponding to a first object before ordering a stored RPC request corresponding to a second object, where at least one ordered RPC request corresponding to the first object was generated by the apparatus earlier than any ordered RPC request corresponding to the second object.

In a fifth implementation form of the method according to the fourth implementation forms of the third aspect, a status of each generated RPC request is set when being stored in the data structure and afterwards updated based on a status of previously ordered RPC requests.

In a sixth implementation form of the method according to the fifth implementation form of the third aspect, the status of each generated RPC request is one of following: PENDING, SENDABLE, SENT and COMPLETED. The status is set as PENDING at the moment when the generated RPC request is stored in the data structure. The status is set as SENDABLE, if the ordered RPC request corresponding to an object is not sent and statuses of all the previous sent RPC requests corresponding to said object are set as COMPLETED. The status is set as SENT, if the ordered RPC request is sent and a response to said ordered RPC request is not received by the apparatus. The status is set as COMPLETED, if the response to the ordered RPC request is received.

In a seventh implementation form of the method according to any of previous implementation forms of the third aspect, the ordered RPC requests are sent in the batch by a thread running in the apparatus.

In an eighth implementation form of the method according to the seventh implementation forms of the third aspect, the ordered RPC requests are sent to a server which is outside the apparatus.

In a ninth implementation form of the method according to any of previous implementation forms of the third aspect, the method may further store the generated RPC requests in a shared data structure in the apparatus, where the shared data structure is accessible by both a client and a RPC manager in the apparatus.

In a tenth implementation form of the method according to any of the second to the ninth implementation forms of the third aspect, the operation to be executed based on the RPC request is a database operation and the object is a database object.

The method of the present invention achieves the same advantages as described above for the apparatus. The method may be carried out with additional method steps, which correspond to the functions carried out by the various implementation forms described above for the apparatus.

BRIEF DESCRIPTION OF THE DRAWINGS

The above aspects and implementation forms of the present invention will be explained in the following description of specific embodiments in relation to the enclosed drawings, in which.

DETAILED DESCRIPTION OF THE EMBODIMENTS

Figure 1:
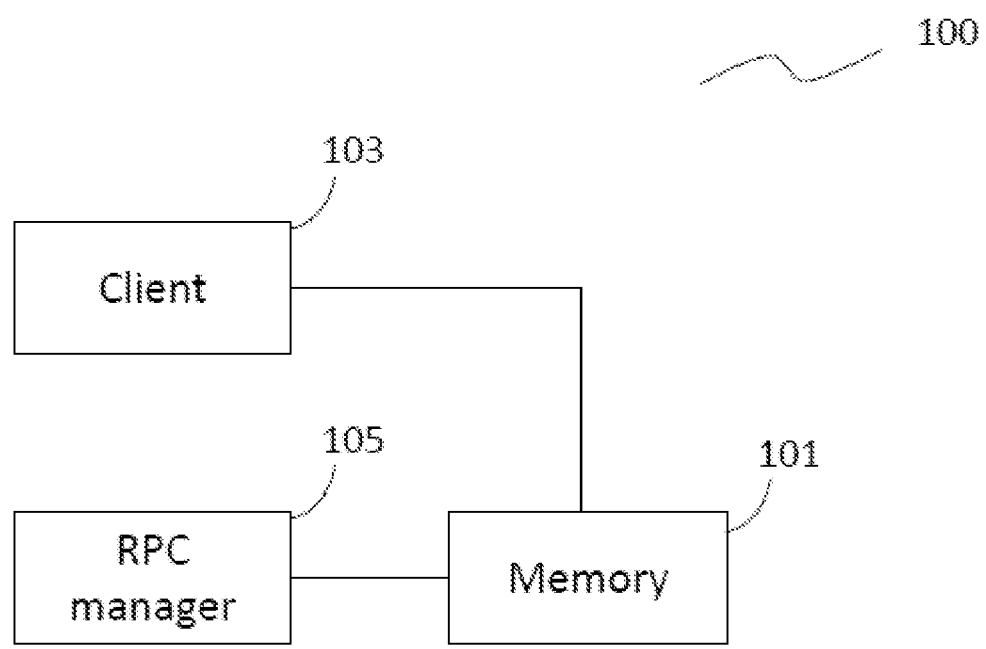
FIG. 1 shows a block diagram schematically illustrating an apparatus according to an embodiment of the present invention.

FIG. 1 shows a block diagram schematically illustrating an apparatus according to an embodiment of the present invention. The apparatus 100 is capable of running a plurality of threads. The apparatus 100 can be any apparatus supporting an RPC procedure, for example, a computer.

The apparatus 100 of FIG. 1 includes a memory 101, an RPC processing unit which may be for instance a client 103 and an RPC manager 105. The client 103 and the RPC manager 105 are respectively connected to the memory 101. The connection can support a management, by the client 103 and the RPC manager 105, of data stored in the memory 101, such as reading, writing, etc. The client 103 can be a software unit, or hardware within a computer and configured to perform specific functions. Examples of the functions performed by the client 103 are given in the following.

Figure 2:
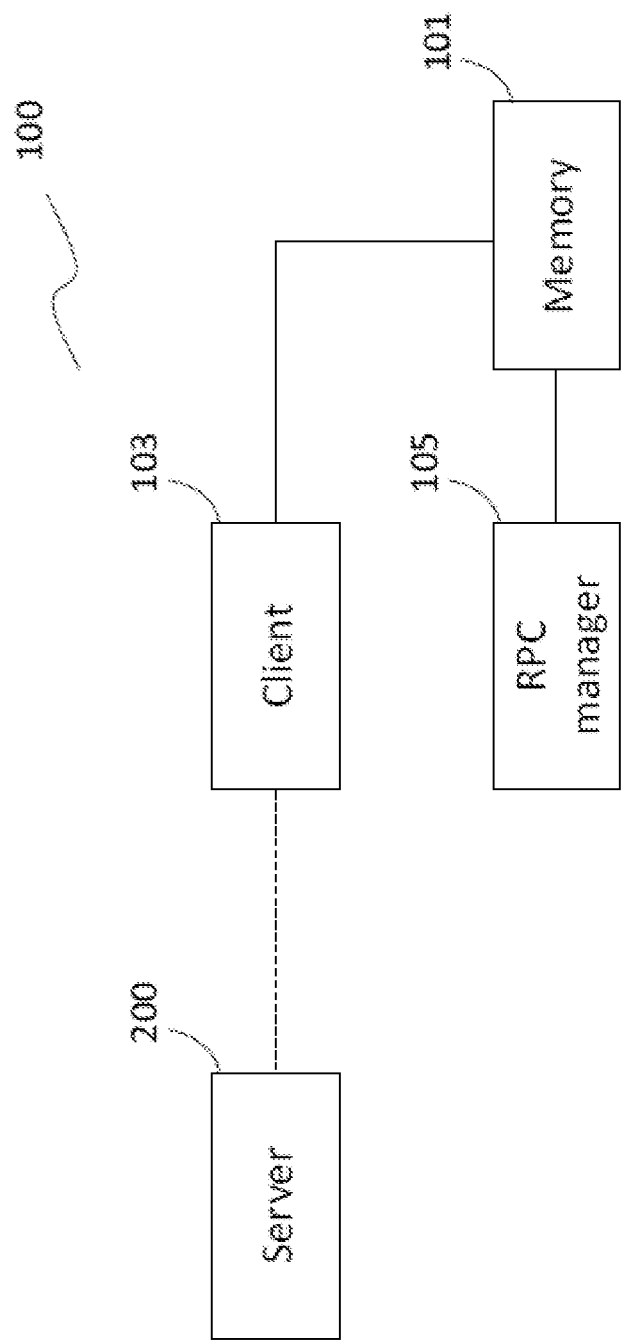
FIG. 2 shows a block diagram schematically illustrating a system according to an embodiment of the present invention.

FIG. 2 shows a block diagram schematically illustrating a system according to an embodiment of the present invention. The system may be a computer system. The computer system includes the apparatus 100 and a server 200. The server 200 may be an apparatus located outside the apparatus 100, e.g., a remote apparatus being capable of communicating with the apparatus 100. Alternatively, the server 200 can be a part of the apparatus 100, e.g., a unit located inside the apparatus 100. In other words, the apparatus 100 is considered as the system, and the communication between the server 200 and the client 103 is inside the apparatus 100.

As shown in FIG. 1 and FIG. 2, the client 103 is configured to generate, for each of the plurality of threads an RPC request for executing an operation and to store the generated RPC requests in the memory 101. The RPC manager 105 is configured to order the stored RPC requests. The client 103 is further configured to send the ordered RPC requests in an RPC batch.

In an example, the operation to be executed based on the RPC request is a database operation and the object is a database object. The database operations can be performed on a database and may be defined as a mapping from one database state to another. Such mappings do not need to preserve consistency of data. A database object may be any defined object in a database that is used to store or reference data. For example, a database object is a unit of data in the database such as one or more fields of a record, one or more records, or one or more tables.

Figure 3:
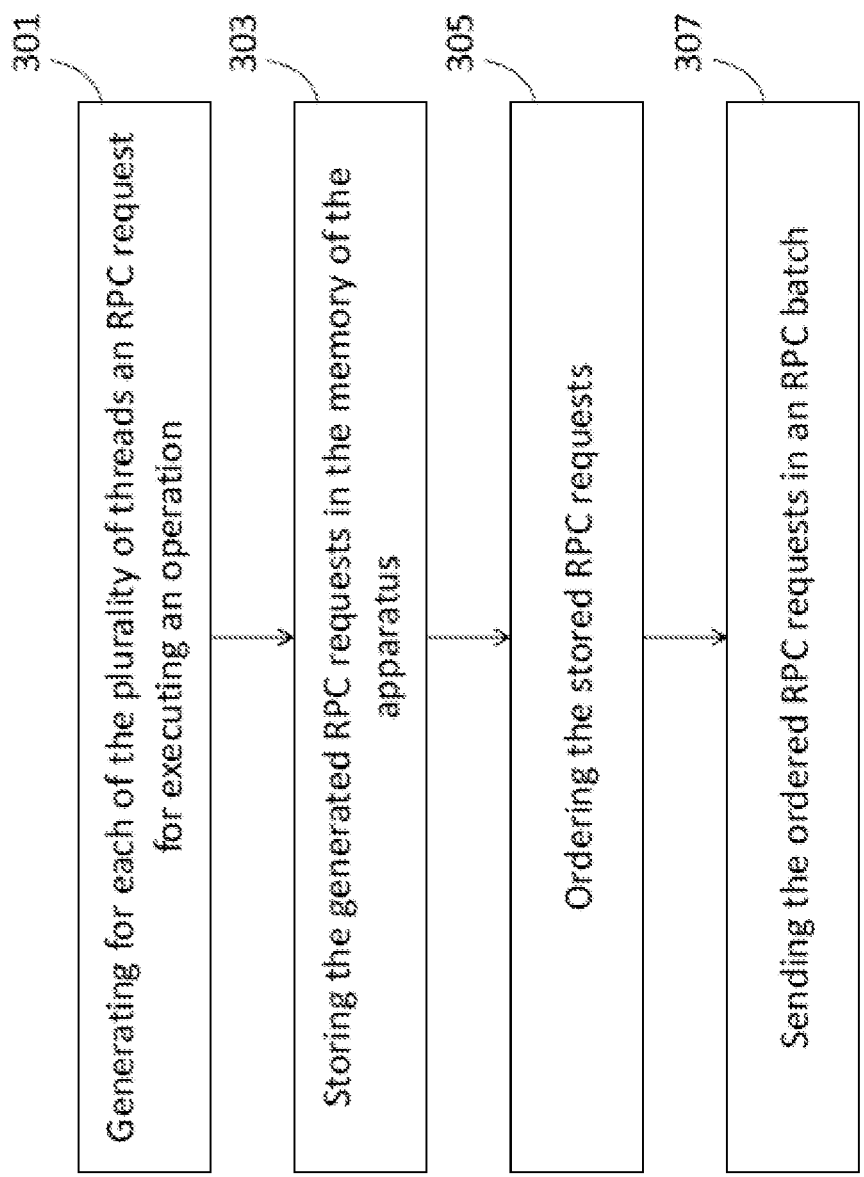
FIG. 3 shows a method of running a plurality of threads according to an embodiment of the present invention.

FIG. 3 shows a method of running a plurality of threads, which can be performed by the apparatus 100 as shown in FIG. 1 and FIG. 2, according to an embodiment of the present invention. For each of the plurality of threads, the client 103 generates an RPC request for executing an operation (step 301) and further stores the generated RPC requests in the memory 101 (step 303). The RPC manager 105 orders the stored RPC requests so that the client sends the ordered RPC requests in an RPC batch (step 305, step 307).

The apparatus 100 may be used in a multitasking environment. The simplest one is multithreading. Therefore, in step 301, one thread in the client 103 can simulate a plurality of threads to generate a plurality of RPC requests.

It is not limited which thread is used to send the ordered RPC requests in the present invention. In other words, the ordered RPC requests can be sent in the batch by any thread running in the apparatus 100. Comparing with the prior art where a thread generating an RPC request must send the RPC request and wait for its corresponding RPC response, the client 103 can send the batch including the ordered RPC requests by means of a thread different from that generating the ordered RPC requests. The threads occupied by the RPC procedures can be timely released and used to generate other RPC requests. Therefore, efficiency of processing the RPC requests in the apparatus 100 is increased.

Additionally, threads running in the apparatus 100 can be distinguished by their functionalities. In a dedicated thread solution, one or more threads may be dedicated to do network communications such as sending the batch. For example, some threads may be dedicated to generate the RPC requests, while some threads may be dedicated to send the RPC batch. Therefore, the client 103 can be further configured to determine a specific thread or a specific group of threads to send the RPC batch. In such a way, improved efficiency of processing the RPC requests in the apparatus 100 can be guaranteed.

The client 103 can be configured to store the generated RPC requests in a shared data structure 400 accessible by the RPC manager 105. The shared data structure 400 can be in a database, for instance, in the memory 101.

The apparatus 100 may reorder the RPC requests as desired using a priorization mechanism. In different priorization mechanism, different parameters may be considered. For example, a parameter "generation time" may give a higher priority to an earlier generated RPC requests. A parameter "quality of service" that is associated to the RPC may give a higher priority to RPC requests being associated to a certain quality of a service. A parameter "RPC size" may give a higher priority to RPC requests with a certain size. A parameter "destination address" may give a higher priority to RPC requests with a certain destination address.

In the following embodiment, the parameter of the priorization mechanism is the generation time, i.e., time at which the RPC request is generated.

Figure 4:
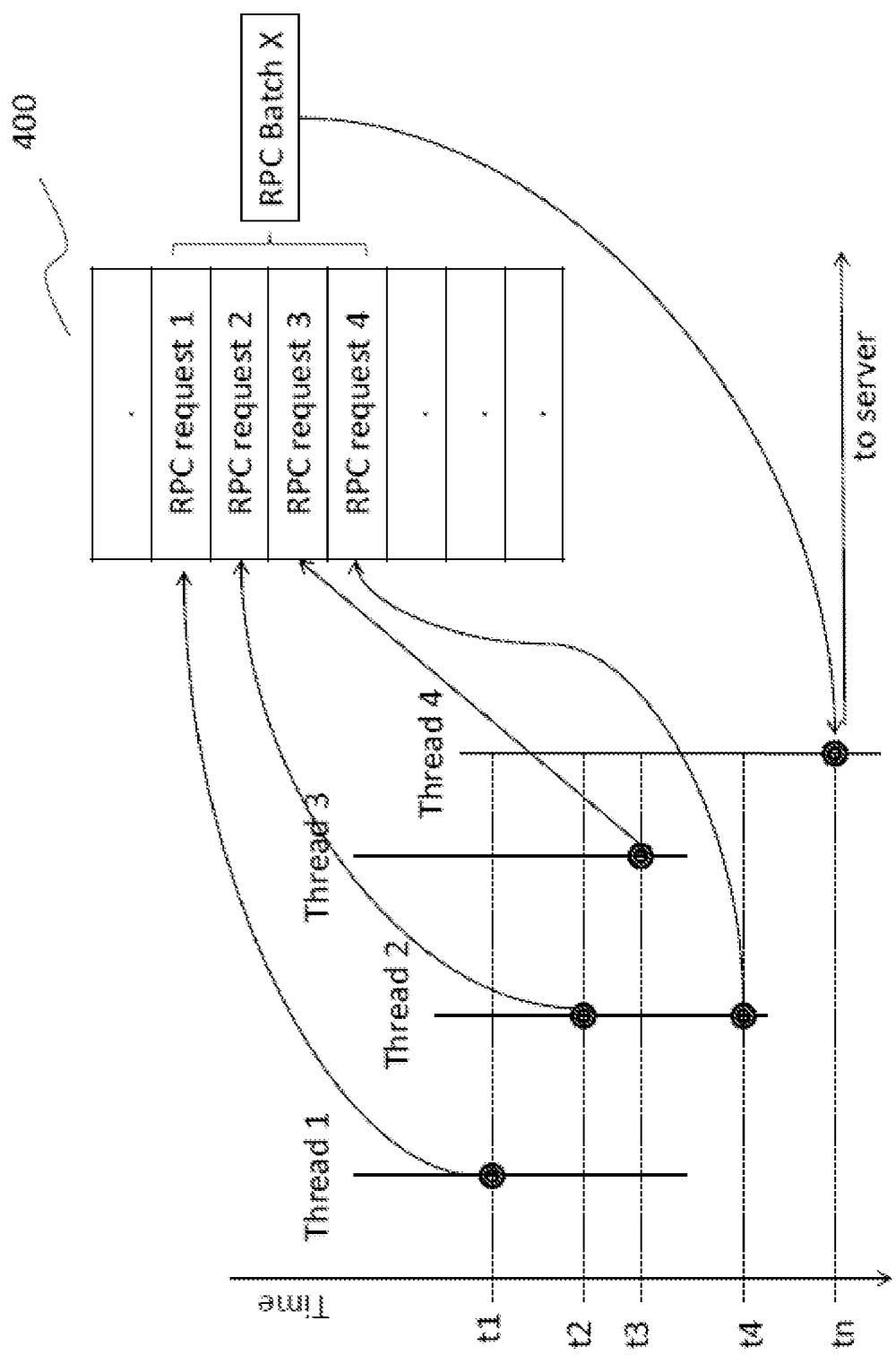
FIG. 4 shows a management process of RPC requests according to an embodiment of the present invention.

FIG. 4 shows a management process of RPC requests according to an embodiment of the present invention. "Time" in FIG. 4 may for instance indicate a running clock in the system. Each RPC requests 1, 2, 3 and 4 are respectively generated at time t1, t2, t3 and t4 by the client 103. The shared data structure 400 stores RPC requests 1, 2, 3 and 4 which are generated by one of Thread 1, Thread 2 and Thread 3. The RPC manager 105, which can access the shared data structure 400, orders the RPC requests 1, 2, 3 and 4 based on a time at which the stored RPC requests 1, 2, 3 and 4 are generated by the client 103. The client 103 sends RPC Batch X including the ordered RPC requests 1, 2, 3 and 4 by Thread 4 to a server at time tn, for instance a predefined time at which Thread 4 reads the shared data structure 400 and sends the RPC Batch X. The client continuously pools so as to obtain the RPC responses corresponding to the RPC requests included in the RPC Batch X.

If the RPC manager 105 takes one parameter, e.g., the time at which the stored RPC request is generated, into account when determining a ranking of the stored RPC request, the RPC requests included in RPC Batch X can have an order of "RPC request 1 generated by Thread 1→RPC request 2 generated by Thread 2→RPC request 3 generated by Thread 3→RPC request 4 generated by Thread 2" as shown in FIG. 4. This sequence indicates how the RPC manager 105 orders RPC requests 1, 2, 3 and 4 sequentially. For example, the RPC request 1 is ordered earlier by the RPC manager 105. This means that a ranking of the RPC request 1 is higher than those of the RPC requests 2, 3 and 4. Therefore, when being grouped in RPC Batch X, the RPC request 1 has a higher priority compared with the RPC requests 2, 3 and 4.

Further, the RPC manager 105 can be configured to determine for each of the stored RPC requests one object, and order the stored RPC requests based on two parameters: the time at which the stored RPC request is generated and the determined object. In other words, the ranking of each RPC request is determined based on the time at which the stored RPC request is generated and the determined object. The order of the RPC requests in the shared data structure 400 is determined based on the rankings of all the RPC requests. In particular, the RPC manager 105 is configured to assign a ranking for each RPC requests based on the time and the object. The ranking indicates how the RPC requests are ordered by the RPC manager 105.

For a given object, the RPC requests corresponding to the object are ordered according to the time at which the RPC requests are generated as explained above.

Assuming that the RPC requests 1, 2, 3 and 4 correspond to a same object, the RPC requests included in RPC Batch X can have an order of "RPC request 1→RPC request 2→RPC request 3→RPC request 4".

Alternatively, the RPC requests 1, 2, 3 and 4 may correspond to different objects. For instance, the RPC requests 1 and 3 correspond to object 1, the RPC request 2 corresponds to object 2, and the RPC request 4 corresponds to object 3. The RPC manager 105 can determine how to order the RPC requests 1, 2, 3 and 4 as shown in FIG. 5.

Figure 5:
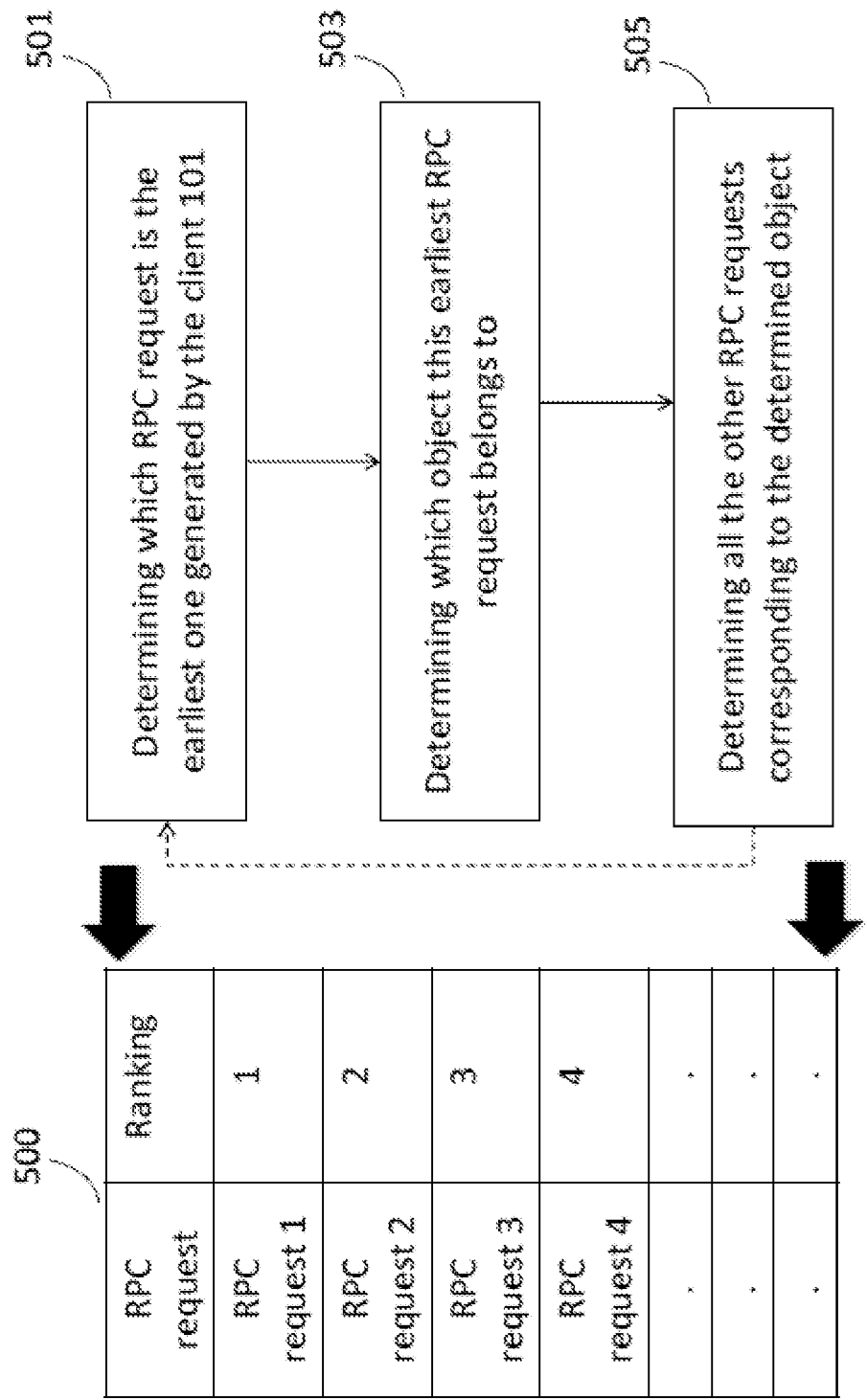
FIG. 5 shows a method of ordering RPC requests according to an embodiment of the present invention.

As an example of Step 305 in FIG. 3, FIG. 5 shows a method of ordering RPC requests according to an embodiment of the present invention. A table 500 includes information of the RPC requests that are generated by the client 103. In other words, the RPC requests stored in the shared data structure 400 can be recorded in the table 500.

The table 500 can be stored in the memory 101 and is accessible by both the client 103 and the RPC manager 105. The table 500 can be updated each time when any parameter related to the RPC request is changed. In other words, both the client 103 and the RPC manager 105 can take an execution related to one or more of the RPC requests as a trigger to update the table 500. In one example, the table 500 is updated by the RPC manager 105 each time when one or more RPC requests are ordered. In another example, the table 500 is updated by the client 103 each time when one or more RPC requests are generated.

As shown in FIG. 5, the RPC manager 105 determines which RPC request, among the RPC requests being not ordered, is the earliest one generated by the client 103 (step 501). The RPC manager 105 orders this earliest RPC request before ordering other generated RPC requests. In other words, the RPC manager 105 assigns a ranking for this earliest RPC request to give it a highest priority among the non-ordered RPC requests so as to order this earliest RPC request. The RPC manager 105 can further update the table 500 accordingly. For example, the RPC manager 105 assigns a ranking of this earliest RPC request (e.g., RPC request 1) as "1" in the table 500.

In step 503, the RPC manager 105 determines which object this earliest RPC request belongs to. For example, object 1 is determined and recorded in the table 500 (not shown in FIG. 5).

In step 505, the RPC manager 105 checks whether there are other RPC requests corresponding to the same determined object. If yes, these RPC requests are ordered by the RPC manager 105 based on the time each RPC request is generated. For example, the RPC manager 105 orders the RPC request 3 earlier than ordering the RPC request 2 because the RPC request 3 and the RPC request 1 belong to the same object. Further, the RPC manager 105 can update the table 500 accordingly. For example, the RPC manager 105 assigns a ranking of the RPC request 3 as "2" in the table 500.

If all the RPC requests corresponding to the same determined object are ordered, the RPC manager 105 determines, among all the generated but not ordered RPC requests, which RPC request is the earliest one generated by the client 103. For example, the RPC manager 105 takes the procedure of steps 501, 502 and 503 as an iterated algorithm. That is, taking a different (updated) plurality of the RPC requests as input of the procedure each time as shown in FIG. 5, the RPC manager 105 continuously orders the RPC requests stored in the memory 101 based on parameters such as the time and the object.

Figure 6:
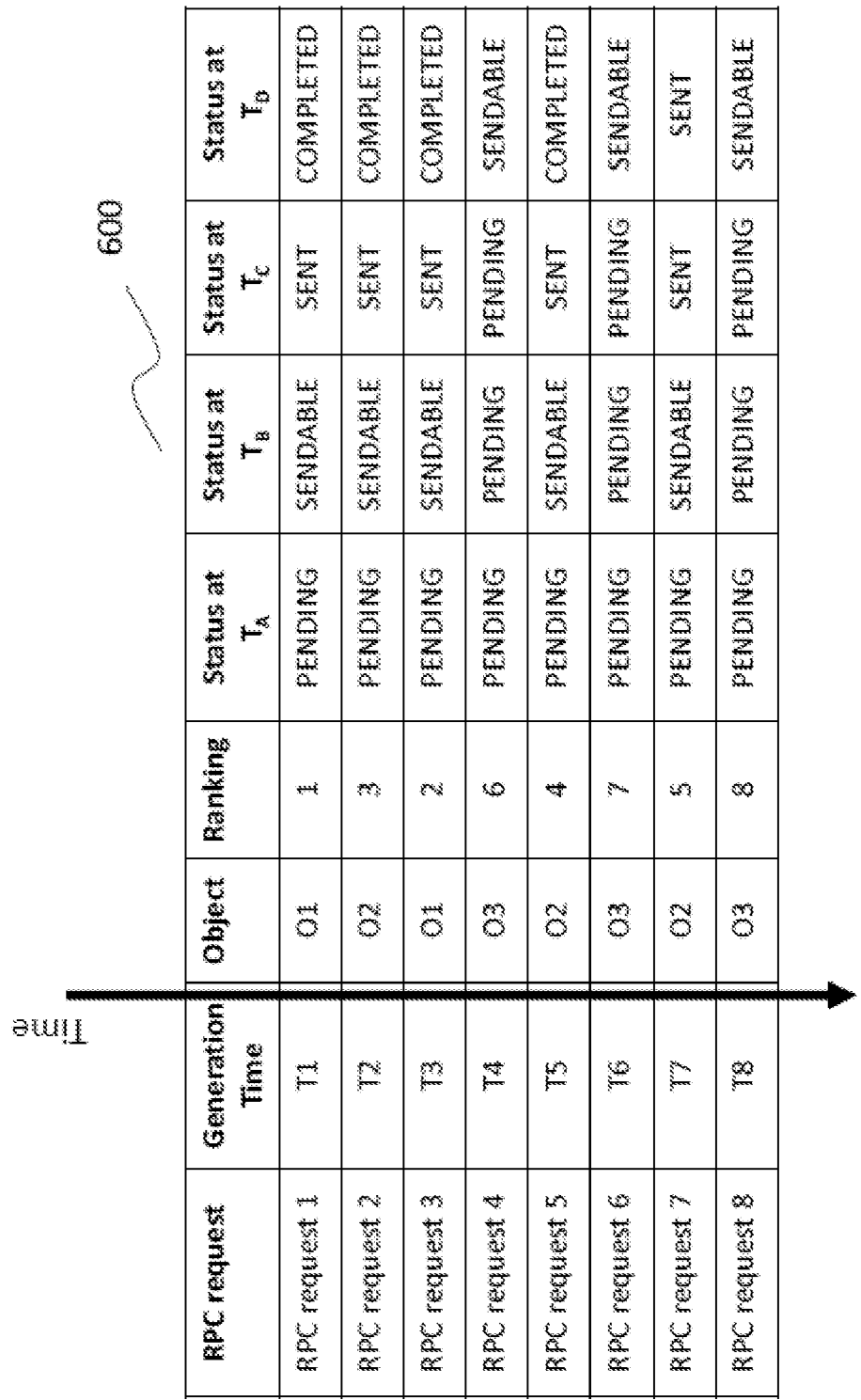
FIG. 6 shows a management process of RPC requests according to a further embodiment of the present invention.

FIG. 6 shows a management process of RPC requests according to a further embodiment of the present invention.

As shown in FIG. 6, table 600 includes several parameters used to manage RPC requests stored in the shared data structure 400. The parameters includes: "generation time" at which the RPC requests are generated by the client 103, "object" that the RPC requests belong to, "ranking" that the RPC manager 105 assigns for the RPC requests.

The parameters further include a status of each RPC request. The status can be set and updated by the client 103 or the RPC manager 105. In one example, the client 103 sets the status of an RPC request when storing the RPC request in the shared data structure 400. In another example, the RPC manager 105 can update (reset) the status of the RPC request based on a status of previously ordered RPC requests.

The status of each RPC request can be one of following: PENDING, SENDABLE, SENT and COMPLETED.

As shown in FIG. 6, the client 103 sets each status of RPC requests 1-8 as PENDING at the moment when each of the RPC requests 1-8 is stored in the shared data structure 400. The apparatus 100 is not ready to send the RPC requests with a status of PENDING.

The RPC manager 105 orders the RPC requests, e.g., with the method above shown as FIG. 5, and records the results of the ordering step in the item "order" in the table 600.

Assume that, at TA as shown in FIG. 6, only a part of the RPC responses corresponding to RPC requests generated earlier than the RPC request 1 have been received by the apparatus 100. For example, all the RPC responses corresponding to the RPC requests that belong to object 1 and object 2 have been received. The RPC responses corresponding to the RPC requests that belong to object 3 have not been received.

At TA, the client 103 sets the status of all the RPC requests belonging to object 1 (i.e., RPC requests 1 and 3) as SENDABLE.

Assume the RPC batch is determined by the apparatus 100 to include more RPC requests, for example, 6 RPC requests. At TB, the client 103 further sets the status of all the RPC requests belonging to object 2 (i.e., RPC requests 2, 5 and 7) as SENDABLE.

All the other ordered RPC requests belong to object 3 (i.e., RPC requests 4, 6 and 8) are not ordered by the RPC manager 105 at TB. Because the RPC responses corresponding to the previously generated RPC requests (with the status of SENT) that belong to object 3 have not been received, none of RPC requests 4, 6 and 8 will be updated, i.e., set as the status of SENDABLE even though the RPC batch has an ability to include one more RPC request.

The client 103 batches the RPC requests 1, 2, 3, 5 and 7 into an RPC batch based on their order. Further, the client 103 sends the RPC batch to a server, and updates the status of the RPC requests 1, 2, 3, 5 and 7 as SENT at TC.

Assume that after TC, the RPC responses corresponding to the RPC requests 1, 2, 3 and 5 have been received by the apparatus 100. At TD, the client 103 sets the status of the RPC requests 1, 2, 3 and 5 as COMPLETED. The status of the RPC request 7 is maintained as SENT because no RPC response corresponding to the RPC request 7 has been received before TD.

Further assume that the RPC responses corresponding to the previously generated RPC requests that belong to object 3 also have been received by the apparatus 100 before TD. The status of the previously generated RPC requests that belong to object 3 can be set as COMPLETED (not shown in FIG. 6). At TD, the client 103 can set the status of the RPC requests belonging to object 3, i.e., RPC requests 4, 6 and 8, as SENDABLE.

The status of the RPC requests 4, 6 and 8 will be updated by the client 103 when an RPC batch including the RPC requests 4, 6 and 8 is sent.

The parameters related to the RPC requests are optional and not limited to be simultaneously in one table. Any mechanism supporting the client 103 and the RPC manager 105 to implement the management of the RPC requests is included in the present invention.

In summary, the apparatus 100 and the method for running a plurality of threads are able to increase efficiency of an RPC procedure.

The present invention has been described in conjunction with various embodiments herein. However, other variations to the disclosed embodiments can be understood and effected by those skilled in the art in practicing the claimed present invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. For example, a (non-transitory) computer-readable storage medium may include instructions which, when executed by a computer, cause the computer to carry out the method according to the embodiments of the present invention.

What is claimed is:

1. An apparatus for running a plurality of threads, the apparatus comprising:
    a memory;
    a client, configured to generate, for each of the plurality of threads a remote procedure call (RPC) request for executing an operation and to store the generated RPC requests in the memory; and
    an RPC manager, configured to determine for each of the stored RPC requests at least one database object, and order the stored RPC requests based on a time at which the stored RPC requests are generated and the determined object;
    wherein the client is further configured to send the ordered RPC requests in an RPC batch; and
    wherein the RPC manager is configured to order all the stored RPC requests corresponding to a first object before ordering a stored RPC request corresponding to a second object, and wherein at least one ordered RPC request corresponding to the first object was generated by the client earlier than any ordered RPC request corresponding to the second object.

2. The apparatus according to claim 1, wherein a status of each generated RPC request is set when being stored in the data structure, and afterwards updated based on a status of previously ordered RPC requests.

3. The apparatus according to claim 2, wherein the status of each generated RPC request is one of following:
   PENDING, being set at the moment when the generated RPC request is stored in the data structure;
   SENDABLE, if the ordered RPC request corresponding to an object is not sent and statuses of all the previous sent RPC requests corresponding to the object are set as COMPLETED;
   SENT, if the ordered RPC request is sent and a response to the ordered RPC request is not received by the client; and
   COMPLETED, if the response to the ordered RPC request is received.

4. The apparatus of claim 1, wherein all the ordered RPC requests correspond to the same object.

5. The apparatus according to claim 1, wherein the ordered RPC requests are sent in the batch by a thread running in the apparatus.

6. The apparatus according to claim 5, wherein the ordered RPC requests are sent to a server which is outside the apparatus.

7. The apparatus according to claim 1, wherein the client is configured to store the generated RPC requests in a shared data structure accessible by the RPC manager.

8. The apparatus according to claim 1, wherein the operation to be executed based on the RPC request is a database operation.

9. A system, comprising:
   an apparatus for running a plurality of threads, the apparatus comprising:
      a memory;
      a client, configured to generate, for each of the plurality of threads a remote procedure call (RPC) request for executing an operation and to store the generated RPC requests in the memory; and
      an RPC manager, configured to determine for each of the stored RPC requests at least one database object, and order the stored RPC requests based on a time at which the stored RPC requests are generated and the determined object;
      wherein the client is further configured to send the ordered RPC requests in an RPC batch; and
      wherein the RPC manager is configured to order all the stored RPC requests corresponding to a first object before ordering a stored RPC request corresponding to a second object, and wherein at least one ordered RPC request corresponding to the first object was generated by the client earlier than any ordered RPC request corresponding to the second object; and
   a server configured to receive the RPC batch from the apparatus.

10. A method for running a plurality of threads, comprising:
   generating, by an apparatus, for each of the plurality of threads a remote procedure call (RPC) request for executing an operation;
   storing, by the apparatus, the generated RPC requests in a memory of the apparatus;
   determining, by the apparatus, for each of the stored RPC requests at least one database object;
   ordering, by the apparatus, the stored RPC requests based on a time at which the stored RPC requests are generated and the determined object; and
   sending, by the apparatus, the ordered RPC requests in an RPC batch;
   wherein the apparatus orders all the stored RPC requests corresponding to a first object before ordering a stored RPC request corresponding to a second object, and wherein at least one ordered RPC request corresponding to the first object was generated by the client earlier than any ordered RPC request corresponding to the second object.

11. The method according to claim 10, wherein a status of each generated RPC request is set when being stored in the data structure and afterwards updated based on a status of previously ordered RPC requests.

12. The method according to claim 11, wherein the status of each generated RPC request is one of following:
   PENDING, being set at the moment when the generated RPC request is stored in the data structure;
   SENDABLE, if the ordered RPC request corresponding to an object is not sent and statuses of all the previous sent RPC requests corresponding to the object are set as COMPLETED;
   SENT, if the ordered RPC request is sent and a response to the ordered RPC request is not received by the apparatus; and
   COMPLETED, if the response to the ordered RPC request is received.

13. The method according to claim 10, wherein all the ordered RPC requests correspond to the same object.

14. The method according to claim 10, wherein the ordered RPC requests are sent in the batch by a thread running in the apparatus.

* * * * *